United States Patent

[11] 3,590,378

[72] Inventor Georges Kassabgi
 Pregnana Milanese, Milan, Italy
[21] Appl. No. 775,790
[22] Filed Nov. 14, 1968
[45] Patented June 29, 1971
[73] Assignee General Electric Information Systems S.p.A.
 Caluso (Turin), Italy
[32] Priority Nov. 16, 1967
[33] Italy
[31] 22,747/67

[54] FAULT-DETECTING MONITOR FOR INTEGRATED CIRCUIT UNITS
 5 Claims, 14 Drawing Figs.
[52] U.S. Cl. ..................................... 324/158, 324/51, 324/73
[51] Int. Cl. ..................................... G01r 31/22, G01f 31/30.
[50] Field of Search ........................... 324/51, 158, 73

[56] References Cited
UNITED STATES PATENTS
3,286,175 11/1966 Gerbier ........................ 324/73
3,466,544 9/1969 Balderston .................. 324/158

Primary Examiner—Rudolph V. Rolinec
Assistant Examiner—Ernest F. Karlsen
Attorneys—George V. Eltgroth and Joseph B. Forman ABSTRACT: A substrate supporting an operational integrated circuit and further supporting a fault-detecting monitor integrated circuit, wherein the monitor circuit samples a plurality of check points in the operational circuit to sense faulty functioning of the operational circuit, enters into a storage member an indicium of the fault status of the operational circuit, and delivers at output terminals of the substrate signals representing the indicium stored in the storage member.

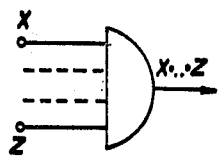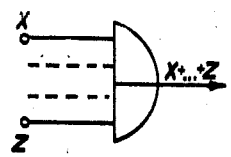
FIG.1  FIG.2  FIG.3
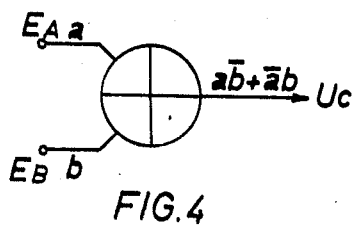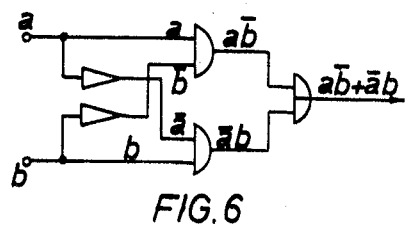
FIG.4  FIG.6
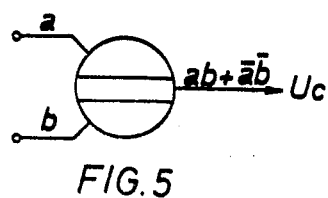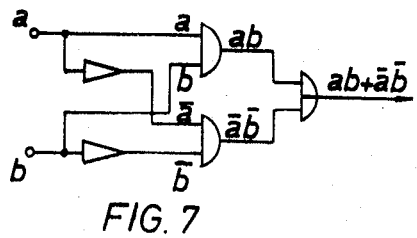
FIG.5  FIG.7
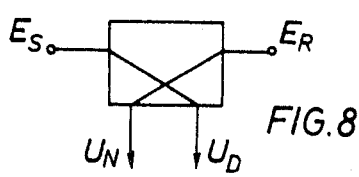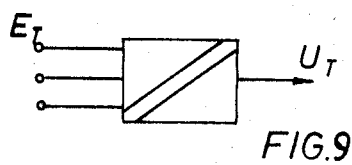
FIG.8  FIG.9
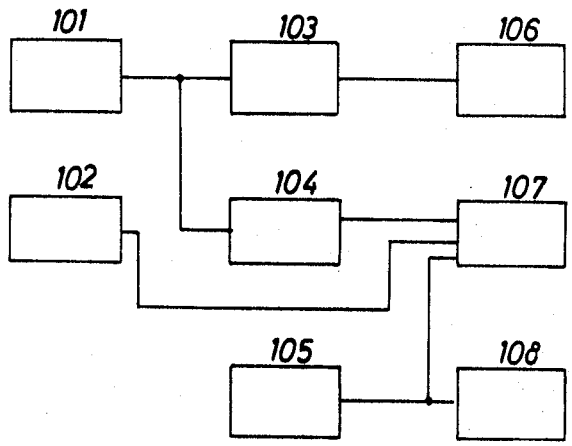
FIG.12

FAULT-DETECTING MONITOR FOR INTEGRATED CIRCUIT UNITS

The present invention relates to an improvement of integrated circuits, and consists of providing such circuits with means for fault detection.

Integrated circuit units, which comprise relatively complex circuits, formed by conductive, semiconductive and insulating elements of extremely reduced dimensions, obtained through diffusion, or deposition, or other known processes, of suitable materials on a single chip of semiconductive material, for instance doped silicon, according to predetermined patterns, are known.

In such integrated circuit units, the chip which supports the integrated circuits is enclosed in a suitable casing provided with a number of pins for connection to external circuits. The connections between such pins and the input and output terminals of the integrated circuit are formed by very thin metallic wires soldered to the pins and to proper pads of the integrated circuit. Complex electronic apparatus for processing, calculating, or transmitting data comprise a great number of such integrated circuit units, it is thus necessary to be able to check the correct operation of these integrated units and, in case a fault is detected, to identify the defective unit as soon as possible. In the present state of the art, this is accomplished by the use of diagnostic programs, which provide for applying a suitable sequence of data to the inputs of the apparatus, and by checking the sequence of output data This requires considerable time and energy, and does not guarantee complete accuracy that at any period of time and during any data processing operation, the computer is free from failure.

Element or circuit redundancy is also used to increase operation reliability. The number of machine failures is certainly reduced by such means, but this method is very expensive and usually does not provide detection of faults nor identification of their location.

An object of the present invention is to provide means for immediately identifying the integrated circuit unit involved in any detected failure, or at least, a restricted set of units including the defective unit.

An alternative object of the invention is to provide means for checking, at any time, by a simple sequence of operations, the existence of defective integrated units, and for positively identifying the defective unit, or at least a restricted set of units including the defective one.

SUMMARY OF THE INVENTION

These objects are attained, according to the invention, by providing each integrated circuit unit, comprising at least one main circuit fabricated on a single chip, with an auxiliary fault detecting circuit, fabricated on the same chip by processes compatible and to some extent partially common with those used for fabricating the main circuit, the auxiliary circuit comprising a logic unit, means for comparing the output of the logic unit with the output of the main circuit, means for memorizing the result of this comparison, and means for signalling to the exterior of the integrated circuit unit the occurrence of a fault. In addition, the auxiliary unit may consist of at least one double threshold circuit for checking that voltage input values are sufficiently near to the correct input values. The auxiliary circuit operates at a speed substantially lower than the main circuit operating speed, so that apparent faults due to transient conditions will not be signalled.

In addition, according to the invention, faults in an integrated circuit unit, which cannot be detected by the fault-detecting auxiliary circuit pertaining to the same integrated unit, may be detected by the fault-detecting circuit pertaining to integrated units logically following the defective integrated unit.

The fault-detecting circuits are preferably obtained through the use of the Metal-Oxide-Semiconductor technique, as the components thus obtained have high input impedance, reduced energy, relatively low speed of operation, high reliability, and are therefore particularly suitable for the purpose.

These and other features and advantages of the invention will be apparent from the detailed description of a preferred embodiment, when read in conjunction with the attached drawings, in which:

FIGS. 1 to 5 show the symbols used to represent different logic functions.

FIGS. 6 and 7 show the logic networks used for obtaining two logic functions.

FIG. 8 shows the symbol used for a flip-flop.

FIG. 9 shows the symbol used for a "double threshold circuit."

FIG. 12 is a block diagram showing a plurality of interconnected integrated units.

Figure 13:
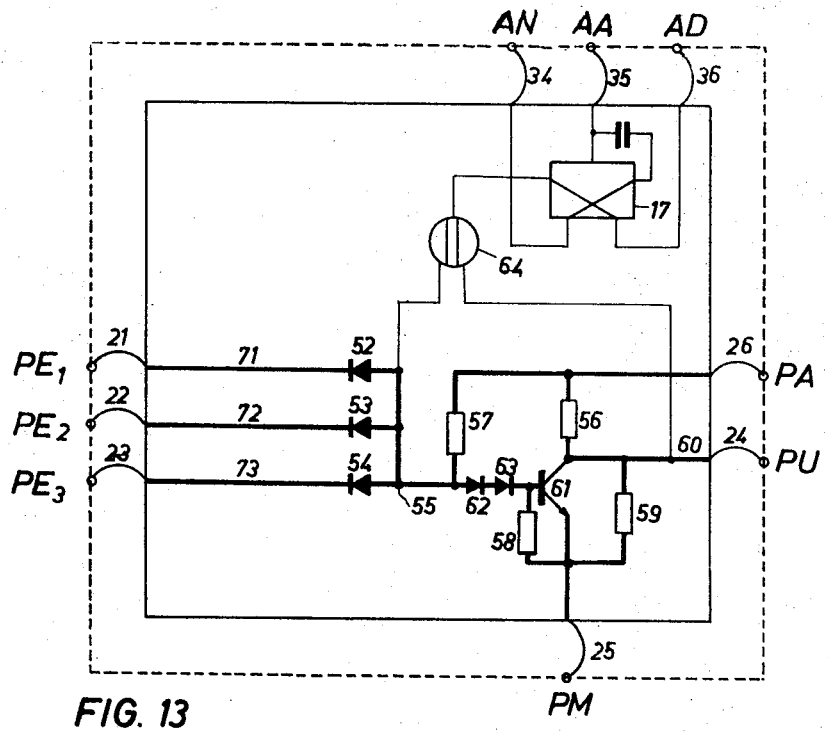

FIG. 13 comprises a simplified wiring diagram of a main circuit, and the logic diagram of a partial fault-detecting circuit.

Figure 14:
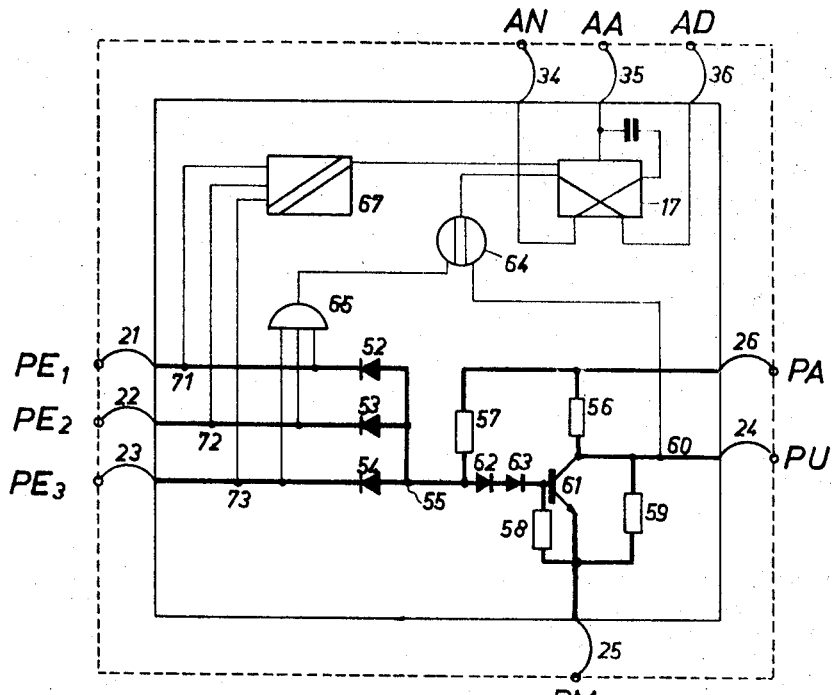

FIG. 14 comprises the wiring diagram of the same circuit as FIG. 13 and the logic diagram of a complete fault-detecting circuit.

The description of the different devices and circuits embodying the invention is based on the following assumptions.

Each integrated circuit unit comprises a chip of semiconductor material supporting a main circuit, or a plurality of main circuits, obtained by known methods, and having the purpose of transferring and processing the input signals according to specified power and speed characteristics, and an auxiliary circuit, or a plurality of auxiliary circuits, for the detection of faults. In the drawings, thick lines are used for the main circuits, thin lines for the auxiliary circuits. In the example shown, it is assumed that the main circuit pertains to the integrated circuit family known as Diode-Transistor Logic or DTL. It is obvious that the descriptions and conclusions are valid, in principle, and if conveniently modified, also apply to integrated circuits pertaining to other families, such as these known as Resistor Transistor Logic (RTL), Transistor-Transistor Logic (TTL), and others.

The following assumptions are made with reference to the signals to be processed:

a positive voltage level $V_1$ represents the logic value ONE a lower voltage $V_0$, in particular $V_0-0$ Volt represents the logic value ZERO A circuit performing the logic function AND is represented by the symbol shown in FIG. 1.

A circuit performing the logic function OR is represented by the symbol shown in FIG. 2.

A circuit performing the logic function NOT, or Inversion, is represented by the symbol shown in FIG. 3.

A circuit performing the logic function "Exclusive OR," which in this description will be called "Diversity," is represented by the symbol shown in FIG. 4. Such circuit produces at its output a logic value ONE if, and only if, the signals at the inputs have different values, that is one is ONE and the other is ZERO. It is well known that such circuit may be obtained by combining the elementary circuits AND, OR, NOT, for example, as shown in FIG. 6.

A circuit performing the "Identity" function is represented by the symbol in FIG. 5. It produces at its output a logic value ONE if, and only if, both inputs have the same value, that is, if they are both ONE or both ZERO. It may be obtained by combining the elementary circuits AND, OR, NOT as shown, for example, in FIG. 7.

A memory device, capable of assuming and maintaining either one of two stable positions, like the bistable circuit commonly called Flip-Flop, is represented by the symbol shown in FIG. 8. It has a "setting" input ES and a "resetting" input ER, a direct output UD and a negated output UN. If a signal of level ONE is applied to the input ES for a sufficient time, while input ER is maintained at ZERO level, the flip-flop will be set in the UP position, whereby its UD output is at ONE value, and the output UN is at ZERO value. It remains in this condition if both inputs are at ZERO level. If a signal ONE of sufficient duration is applied to the ER input, while the ES input remains at ZERO level, the flip-flop goes into the DOWN condition, whereby the output UD is ZERO and the output UN is ONE. Contemporary application of level ONE signals to both inputs is not permitted.

A double threshold circuit, having a definite number of inputs ET and an output UT is represented by the symbol shown in FIG. 9. It produces at its output a value ZERO if, and only if, all inputs ET are maintained either at a voltage between the value $V_0$ and a first threshold value $VS_0$ higher than $V_0$, or to a voltage between a second threshold value, $VS_1$, higher than $VS_0$ and lower than $V_1$, and a value at least equal to $V_1$. The output logic level will be ONE if, and only if, at least one input is at a voltage between the threshold values $VS_0$ and $VS_1$. If, as it has been assumed, $V_0=0V$, and $V_1=5V$, the threshold values, for example, may be $VS_0=1V$, $VS_1=3.5V$.

Figure 10:
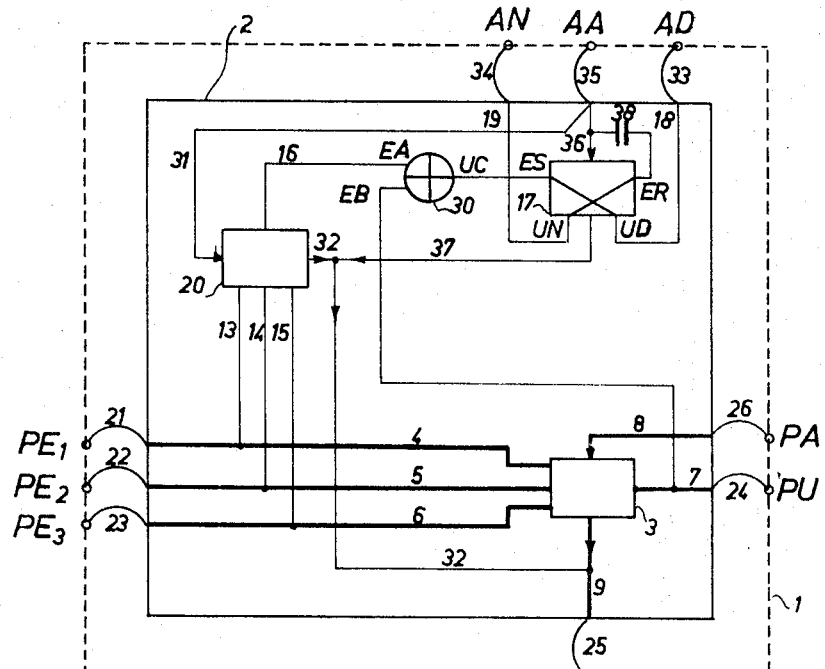
FIG. 10 shows the logic diagram of an integrated unit comprising a partial fault-detecting circuit.

FIG. 10 is a block diagram representing, in a general way, a device according to the invention. An integrated circuit unit is fabricated on a silicon chip 2, and comprises a main circuit 3 having three inputs 4, 5, 6 and an output 7.

The circuit 3 is fed by an appropriate source of voltage through conductor 8 and is connected to ground through conductor 9. The entire integrated unit is enclosed in an airtight casing represented by the broken line 1, and the connecting pins are represented by the small circles on this line.

Three main circuit input pins, $PE_1$, $PE_2$ and $PE_3$ are connected to three input conductors 4, 5, 6 by three wires 21, 22 and 23: a main circuit output pin PU is connected to output conductor 7 by the wire 24; a ground pin PM is connected to the ground conductor 9 by wire 25, and a main circuit feed pin PA is connected to the feed conductor 8 by the wire 26.

The logic elements of the auxiliary fault-detecting circuit comprise a logic unit 20, having three inputs 13, 14, 15 and an output 16, a feed conductors 31 and a ground conductor 32. The three input conductors 13, 14 and 15 are respectively connected to the three main circuit input conductors 4, 5, 6. The logic unit 20 is designed, so as to produce at its output 16 the same logic value which should be present at the output 7 of the main circuit, when the same logic values present at the input conductors of the main circuit, 4, 5, 6 are also present at the inputs of the logic unit 20, and the operation of the main circuit is correct. The auxiliary circuit furthermore comprises a diversity unit 30 having two inputs EA and EB connected respectively to the output 16 of the logic unit 20 and to the output 7 of the main circuit and a flip-flop 17. The output UC of the diversity unit is connected to input ES of flip-flop 17, whose outputs UD and UN are connected, through the wires 33 and 34, to the pins AD and AN. The auxiliary circuit is fed, by an appropriate source of voltage, through an auxiliary feed pin AA and the wire 35 connecting it to the conductor 36 feeding the flip-flop 17 and conductor 31 feeding the logic unit 20. The flip-flop 17 is connected by ground conductors 37 and 32 to the main circuit ground conductor 9. The resetting input ER is connected to the feed conductor 36 by a differentiating device such as capacitor 38. By this means, every time the feeding voltage is restored to the auxiliary circuit after an interruption, the flip-flop is automatically reset into the DOWN condition by a short pulse transmitted through the capacitor 38 or the differentiating device in place thereof. Not all logic elements of the auxiliary fault-detecting circuit need actually be present as some of them may be combined to simplify the circuit. The operation is as follows:

It is assumed that feeding of the auxiliary unit is on. During normal operation the logic values applied to the inputs of the main circuit are also applied to the inputs of the auxiliary logic unit, and therefore the logic values at output 7 of the main unit and at output 16 of the auxiliary unit are equal, except during the transients due to the difference in operating speed of the main circuit and the auxiliary unit. Therefore the output UC of the diversity unit 30 will be, for the greater part of the time, at ZERO level, save for short pulses of level ONE, due to the time differences. The flip-flop 17 is so designed, as to be relatively slow in passing from the DOWN to the UP position, thus being insensitive to these short level ONE pulses, and thus remains in the DOWN condition. In case of failure of the main circuit, its output value is different from the output of the auxiliary logic unit, the diversity unit output goes to value ONE for a time sufficient to set the flip-flop 17 in the UP condition. A signal ONE then appears on its direct output UD and consequently on pin AD, thus signalling to the external circuit the presence of a fault in the unit.

A different mode of operation may also be used, whereby the fault-detecting circuit normally is not being fed, and therefore no signal ONE is present on outputs AN or AD. The feeding voltage is applied only when the correct operation of the apparatus is being checked, and this may happen at regularly spaced intervals of time, as during routine maintenance operations, or in connection with the execution of particular test programs which are able to put all the circuit elements of the apparatus in all possible conditions, thus detecting the existence of faults which may affect the operation only in very exceptional cases, and therefore may not be detected in the normal operation, if the first described mode of operation is used.

The indicated disposition is able not only to detect faults in main circuit 3, but also faults affecting some connections between the main circuit and the external pins, for example, the wire 26 connecting the feed pin PA to the feed conductor 8. The failure of the feeding voltage of the main circuit necessarily causes the malfunctioning of the same, and therefore is signalled. The same disposition also allows detection of the eventual defective operation of the auxiliary logic unit 20, except in the very improbable case where a fault appears on the main circuit at the same time, also causing its defective operation. In case of a break in wire 25, the failure of the common ground connection will cause the fault operation of flip-flop 17, which is conveniently designed, so that the failure of the ground connection will bring the whole circuit up to the feeding voltage, therefore causing level ONE signals to appear on both outputs AN and AD. If the external circuit is provided with a circuit able to detect the contemporary presence of ONE levels on both outputs, such a condition will be signalled as a fault.

In normal operation the fault-detecting circuit cannot detect a fault of the same circuit which would be able to maintain a steady ZERO level on output UD and a steady ONE level on output UN of the flip-flop 17. Such a fault may be detected by periodically checking the operation of the fault-detecting device, for example, interrupting the feeding of the main circuit, and ascertaining that in such condition the auxiliary circuit gives a fault signal.

The fault-detecting circuit as described is unable to detect faults due to the interruption of only one of wire 21, 22, 23. As such interruptions are relatively common, it is convenient to provide means for their detection.

If one of the input wires, for example, wire 21 is interrupted, the associated input conductor 4 assumes a voltage which is determined by the voltages of the remaining input conductors 5 and 6 and by the structure and characteristics of the main circuit 3. In general the voltage assumed by the conductor 4 in such condition will be different from both $V_0$ and $V_1$, and in particular, may be limited between predetermined voltage values $VS_0$ and $VS_1$, whereby $$V_0 < VS_0 < VS_1 < V_1$$

Figure 11:
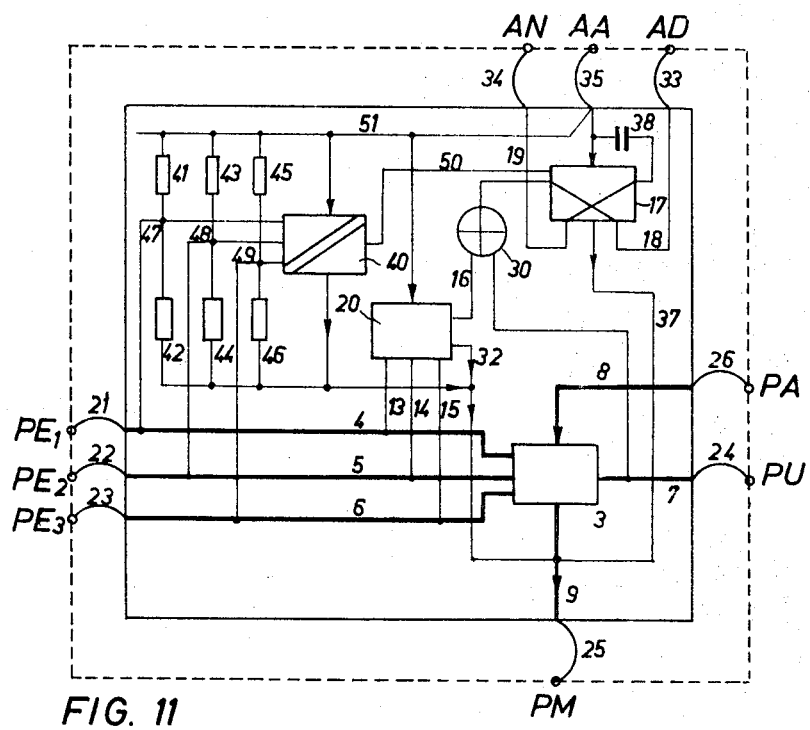
FIG. 11 shows the logic diagram of an integrated unit comprising a complete fault-detecting circuit.

For a given structure of circuit 3, and given signal combinations on conductors 5 and 6, which does not happen in and of itself, it is generally possible to predispose a proper circuit, formed, for example, by a voltage divider fed from the feeding voltage of the auxiliary circuit, and using suitable resistance of proper value, so that, for one of the most frequent signal combinations on conductors 5 and 6 the voltage of the conductor 4 remains in the above indicated limits. FIG. 11 shows a circuit arrangement of this type. The auxiliary circuit comprises a double threshold unit 40 and three voltage dividers formed by resistors 41 and 46, whose central points 47, 48, 49 are respectively connected to input conductors 4, 5 and 6 of the main unit, and to input terminals of the double threshold unit 40, whose output is connected by conductor 50 to a setting input of flip-flop 17.

The feeding of the double threshold unit 40 and of the voltage dividers is provided through conductor 51 and the auxiliary feeding pin AA, and the ground connection is assured by connection to the common ground conductor 9 and ground pin PM.

By means of this arrangement, if for example wire 21 is interrupted, it is generally possible, by choosing the proper values of the resistors forming the voltage divider, to provide that conductor 4 assumes a voltage within a range between $VS_0$ and $VS_1$, which, applied to an input of the double threshold unit, causes a signal ONE to be applied to a setting input of flip-flop 17, which goes into the UP condition and signals a fault to the exterior circuit. The threshold unit has a very high input impedance so that the resistors forming the voltage divider may have resistances sufficiently high, as not to sensibly affect the operation of the main circuit.

The fault detector cannot in general detect a break in wire 24 connecting the output conductor 7 of circuit 3 to the output pin PU. This fault can, however, be detected by the auxiliary circuit of an integrated unit logically following the faulty integrated unit. In fact, a break in the output wire of an integrated unit is equivalent to the interruption of an input wire of the units having one input connected to the said output wire. FIG. 12 represents an example of a succession of interconnected integrated units. Unit 101 has its output connected to an input of each one of the integrated units 103 and 104; units 102, 103, 104 and 105 have their outputs connected to inputs of units 106, 107 and 108 as shown. An interruption of the output wire of unit 101 is detected as an interruption of an input wire in units 103 and 104, which will be indicated as defective. The examination of the connection network will establish that the failure is very probably due to an interruption in the output wire of unit 101, as it is highly improbable that both units 103 and 104 are subject to the simultaneous interruption of their input wires.

In the event of interruption of the output of unit 103, it is not possible to establish whether the fault is in the output of unit 103 or the input of unit 106, and one of such units will be substituted, and a check made to determine if such substitution causes the disappearance of the fault. In case of a failure signalled on unit 107, it may be due either to a fault in the unit, or to an interruption of the output wires of units 102, 104 or 107.

The examination of the interconnection network will limit the number of units which may be involved as for example if unit 108 is operating correctly, only units 102, 104 and 107 may be affected by a fault.

In any case it is seen that the number of possibly defective units, in case a fault is signalled on a given unit, is limited to the same unit and to a restricted number of units immediately preceding the same, that is, those units whose outputs are connected to an input of the given unit.

As shown hereinbefore, the technique to be used for fabricating the auxiliary fault-detecting circuitry must be compatible with the technique employed for fabricating, on the same chip, the main circuit, but may be substantially different, in the light of the peculiar requirements and characteristics of the auxiliary circuit, these requirements being, as shown, reduced dimension, reduced energy consumption, outstanding reliability, whereas the speed requirements are low.

Therefore, the integrated circuit technique known as Metal-Oxide-Semiconductor, (MOS) using as basic element the Field-Effect Transistor (FET) appears to be remarkably suitable for the fabrication of the auxiliary circuit. The MOS technique and the FET elements are well known in the art, and are described for example in the book "Integrated Circuits, Design Principles and Fabrication," by Raymond M. Warner Jr., published by McGraw-Hill New York, 1965. The possibility of obtaining any logical circuit combination, through the use of Field Effect Transistor, is shown in the article "Integrated circuits save space and time" by D. E. Farina and D. Trotter, published by the magazine "Electronics," Oct. 4, 1965. As is shown in these publications, the circuit fabricated according to this technique is characterized by small energy requirement, high input impedance, high reliability, lower speed of operation.

Some examples of fault-detecting circuits in a typical case are now described. The main circuit is a NAND gate, having three inputs, designed according to Diode-Transistor Logic. In FIG. 13 the main circuit is identified by thick lines. It comprises a transistor 61, of the NPN-type and three input diodes 52, 53, 54. The anodes of the diodes are connected to a point 55 to which the base of transistor 61 is also connected through two series connected diodes 62 and 63.

Point 55 is also connected to the feed pin PA through a resistor 57 of relatively high resistance. The collector of transistor 61 is connected to the feed pin PA through a resistor 56 of relatively low resistance. Two resistors 58 and 59 connect the base and the emitter of transistor 61 respectively to the ground pin.

The well-known method of operation of the circuit is briefly continued. If at least one of the inputs $PE_1$, $PE_2$, $PE_3$ is at logic value ZERO, that is the voltage $V_0=0$ Volt, point 55, and, therefore, the base of transistor 61 are also at 0 Volt, the transistor is off, the output 60, connected to its collector, goes to a voltage near to $V_1$ (for example 5 Volt) that is to the logic value ONE. If all inputs are at logic value ONE, that is, at a voltage close to 5 Volt, point 55 reaches a voltage sufficient to render transistor 61 conductive, and the output then goes to 0 Volt, that is to logic value ZERO.

This may be expressed, according to the Boolean logic and symbology, by the expression $u=\overline{a.b.c}=\overline{a}+\overline{b}+\overline{c}$ in which $u$ is the logic value of output, and $a$, $b$, $c$ are the logic values of the inputs.

Different methods may be chosen to design the fault-checking circuit, according to the degree of reliability which is desired. As the transistor 61 is the circuit element most subject to failures, the simplest solution represented in FIG. 13 may be adopted, wherein the function of the auxiliary circuit is merely that of supervising the operation of the transistor.

As the transistor circuit embodies the logic function of inversion, the logic value at point 55, in the case of correct operation, is the negated one of the value at the output 60. If both these values are equal, the operation of the transistor is defective. Therefore, as indicated in FIG. 13, the logic auxiliary unit 20 and the diversity unit 30 of FIG. 10 may be replaced by a simple identity unit 64, having an input connected to point 55, and the other connected to output 60. This identity unit produces a signal ONE on its output if both inputs have the same value, thus causing the flip-flop 17 to go into the UP condition and to signal the fault.

If the auxiliary circuit is also required to supervise the operation of the input circuit formed by the diodes 52, 53, 54, the identity unit is preceded by an AND gate 65 having three inputs each connected to one of the input conductors 71, 72, 73 of the main circuit, as shown by FIG. 14. If the main circuit is operating correctly, and $a$, $b$, $c$, are the logic values at inputs 71, 72, 73, the output 60 is at the logic value $\overline{a.b.c.}$, this value is the negated one of the value $a.b.c.$ at the output of the AND gate 65, and the output of the identity circuit 64 is ZERO. In the event of defective operation of the main circuit there is identity of values at both inputs of the identity circuit, and consequently a signal of level ONE at its output, which causes the flip-flop 17 to go into the UP condition and to signal the fault.

If, moreover, the integrity of the input wires 21, 22, 23 must be supervised, the three input conductors 71, 72, 73 are connected to the three inputs of a double threshold unit 67. Assuming that the wire 21 is broken, and that at least one of inputs $PE_2$ and $PE_3$ is at 0 Volt, point 55 is also at 0 Volt, even if input $PE_1$ is at voltage $V_1$ (5v). This condition is not signalled as a fault, as the same happens if wire 21 is not broken, as in a NAND gate, the output does not depend upon single input values, as long as at least one input is ZERO.

If, on the contrary, both inputs $PE_2$ and $PE_3$ are at voltage $V_1$, and the wire 21 is broken, the voltage at point 55 is determined by the voltage drop across the diodes 62 and 63 and across the base-emitter junction of transistor 61. This voltage valve is intermediate value $V_0$ and value $V_1$. Conductor 21 will assume a "floating" value not substantially lower than the voltage at point 55. By properly choosing the characteristics of components and adjusting the threshold values $VS_0$ and $VS_1$ of the threshold circuit 67 it is possible to have conductor 71 assume a voltage ranging between $VS_0$ and $VS_1$, thus causing the double threshold unit to provide, at its output, a signal ONE which sets the flip-flop 17 at its UP position and generates a fault signal.

For main circuits different from the one indicated in the example, the interruption of an input wire may not be adequate for permitting the voltage of the associate input conductor to assume a value ranging between the threshold values, thus revealing the fault. It may therefore be necessary, as previously shown, to provide suitable circuit arrangements to obtain the desired effect through the heretofore mentioned voltage divider.

The voltage divider is only one example of a circuit which may be effective for obtaining the desired effect. The circuit arrangements to be used are different according to the structure of the main circuit, and it may include not only passive elements such as resistors, but also nonlinear components such as diodes, or active elements as transistors. It is known that all these elements may be easily obtained by MOS technique. It is therefore obvious that in most cases it will be possible to design a circuit arrangement capable of detecting the "floating" condition of an input conductor, due to the interruption of an associated wire, and apply to the conductor a voltage suitable for permitting the double-threshold unit to render a ONE signal at its output for a particular combination of input signals.

What I claim is:

1. An integrated circuit assembly comprising: a main circuit assembly and a fault-detecting circuit assembly on a unitary substrate, said main circuit assembly including a plurality of check points and input and output circuits and providing output binary values responsive to input signals appearing at said input circuits, said binary values being represented by a first voltage level for one state and a second voltage level of different magnitude for the other state; said fault-detecting circuit assembly including logic means for obtaining a binary check value responsive to signals appearing at said check points, means interconnecting said fault-detecting circuit assembly to predetermined ones of said check points, comparing means for comparing the binary check values against the output binary values of said main circuit; said fault-detecting circuit assembly further including threshold detecting means having inputs connected to predetermined check points of said main circuit assembly, said threshold detecting means being responsive to said inputs to render an output of predetermined binary value when one or more of said inputs of said threshold detecting means assumes a voltage intermediate said first and second voltage levels, memory means for storing the results of the comparison effected by said comparing means, means for communicating the output binary value of said threshold detecting means to said memory means, said memory retaining the information received from said threshold detecting means for a predetermined period of time, and means for signaling the contents of said memory means external to said integrated circuit assembly.

2. An integrated circuit assembly comprising a main circuit and an auxiliary fault-detecting circuit, both of said circuits being disposed on a unitary chip, said main circuit being connected to receive a plurality of binary input signals and responsive thereto to generate a binary output signal representing the binary result of a predetermined logical operation performed on said binary input signals by said main circuit, said fault-detecting circuit comprising circuit elements having a slower speed of response than the circuit elements of said main circuit, said fault-detecting circuit being connected to receive a plurality of binary signals present in said main circuit and responsive to the binary signals received thereby to generate an output fault signal at an output point thereof when said binary signals received thereby fail to satisfy a predetermined criterion for the proper operation of said main circuit, memory means disposed on said chip coupled to said output point and responsive to the occurrence of said fault signal for storing a fault indicium and for delivering an output signal representing said stored fault indicium, said memory means being provided with a reset terminal coupled to receive a stimulus generated external to said chip for clearing said fault indicium from said memory means, said memory means maintaining each fault indicium stored thereby until said stimulus is received, an output lead for said chip, and means for coupling said output lead to said memory 3. The integrated circuit assembly of claim 2, wherein said binary signals comprise a first voltage level for representing one binary value and a second voltage level for representing the other binary value, wherein said fault-detecting circuit further comprises a threshold detecting means connected to receive predetermined binary signals present in said main circuit, said threshold detecting means being responsive to the binary signals received thereby to generate an output signal when at least one of said binary signals received thereby assumes a voltage intermediate said first and second voltage levels, and wherein means is provided for coupling said memory means to said threshold detecting means for storing in said memory means a fault indicium when said threshold detecting means output signal is generated.

4. The integrated circuit assembly of claim 2, wherein said fault-detecting circuit comprises a logic unit and comparing means, said logic unit being connected to receive said binary input signals received by the main circuit and responsive to the binary signals received thereby to generate a binary check signal corresponding to the binary output signal generated by said main circuit when said main circuit is properly operative, said comparing means being coupled to receive said binary check signal and the binary output signal generated by said main circuit, said comparing means delivering said output fault signal when said binary output signal received thereby fails to correspond to said binary check signal.

5. The integrated circuit assembly of claim 4, wherein said binary signals comprise a first voltage level for representing one binary value and a second voltage level for representing the other binary value, wherein said fault-detecting circuit further comprises a threshold detecting means connected to receive predetermined binary signals present in said main circuit, said threshold detecting means being responsive to the binary signals received thereby to generate an output signal when at least one of said binary signals received thereby assumes a voltage intermediate said first and second voltage levels, and wherein means is provided for coupling said memory means to said threshold detecting means for storing in said memory means a fault indicium when said threshold detecting means output signal is generated.

UNITED STATES PATENT OFFICE
CERTIFICATE OF CORRECTION

Patent No. 3,590,378            Dated June 29, 1971

Inventor(s) Georges Kassabgi

It is certified that error appears in the above-identified patent and that said Letters Patent are hereby corrected as shown below:

Column 8, line 26, after "memory" insert -- means for providing said memory means output signal on said output lead. --.

Signed and sealed this 18th day of April 1972.

(SEAL)
Attest:

EDWARD M. FLETCHER, JR.           ROBERT GOTTSCHALK
Attesting Officer                   Commissioner of Patents